United States Patent Office 3,769,318
Patented Oct. 30, 1973

3,769,318
PROCESS FOR THE PRODUCTION OF
ALLOPHANATE POLYISOCYANATES
Erwin Windemuth, Leverkusen, and Ulrich Trense, Cologne-Stammheim, Germany, assignors to Bayer Aktiengesellschaft, Leverkusen, Germany
No Drawing. Filed Feb. 23, 1971, Ser. No. 118,157
Claims priority, application Germany, Feb. 27, 1970,
P 20 09 179.6; Aug. 17, 1970, P 20 40 645.5
Int. Cl. C07c *125/06*
U.S. Cl. 260—471 C  9 Claims

ABSTRACT OF THE DISCLOSURE

Allophanate polyisocyanates containing at least one aromatically bound —NCO group are prepared by reacting an N-substituted carbamic acid ester with organic mono- or polyisocyanates in the presence of a compound having an alkylating effect. The allophanate polyisocyanates are obtained free of secondary products having isocyanurate structures, and are especially useful as isocyanate precursors in the production of polyurethane plastics by the isocyanate-polyaddition process.

---

This invention relates to allophanate polyisocyanates, a process for their production and their use as isocyanate precursors in the manufacture of polyurethane plastics.

British Pat. No. 994,890 relates to a process for the production of organic polyisocyanates in which urethane isocyanates, corresponding to the general formula

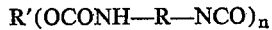

$$R'(OCONH-R-NCO)_n$$

wherein

R' is a monovalent or polyvalent organic radical of a monofunctional or polyfunctional hydroxyl compound,
R is a bifunctional organic radical, and
n is an integer from 1 to 6 are reacted with diisocyanates such that each urethane group is reacted with 1 mol of diisocyanate. At p. 2, lines 52 to 64 of British Pat. No. 994,890, it is stated that the exact composition of the reaction products cannot be specified with any degree of certainty. It is, however, concluded from the measured NCO values of the reaction mixtures, and the end products isolated from them, that the end products are, in essence, allophanate polyisocyanates. If, however, the method used in the aforementioned British patent to identify composition, i.e., determination of the NCO content, is supplemented by infrared spectroscopic measurements, it is frequently possible, if aromatic isocyanates are used, to produce the end products and also be detect isocyanurate polyisocyanates as secondary products, and in some instances as main products, in addition to the claimed allophanate polyisocyanates.

A test carried out under the reaction conditions specified in the aforementioned British patent, using the components ethylene glycol and tolylene diisocyanate mentioned as being particularly suitable therein is clear proof of the presence of other products in addition to the allophanate polyisocyanates in the end product.

62 parts by weight of ethylene glycol are added with stirring over a period of 45 minutes at 70 to 75° C. to 1392 parts by weight of tolylene diisocyanate (80:20 mixture of the 2,4- and 2,6-isomers, 0.005% of hydrolysable chlorine, 0.003% of acid chloride chlorine, 0.01% total chlorine). After the glycol has been added, the reaction mixture is kept at the aforementioned temperature for a period of 1 hour. Thereafter, the mixture containing a finely crystalline deposit has an NCO content of 40.6%, while the theoretical NCO content of a solution of the urethane diisocyanate of 2 mols of tolylene diisocyanate and 1 mol of ethylene glycol, in the excess tolylene diisocyanate initially introduced, would be 40.4%.

The reaction mixture is then heated for 19 hours at 128 to 130° C. in the presence of nitrogen as protective gas. The resulting mixture has an NCO content of 33.9%, while a solution of an allophanate polyisocyanate of 1 mol of the urethane diisocyanate formed in situ and another 2 mols of tolylene diisocyanate, in the excess tolylene diisocyanate, would have theoretical NCO content of 34.7%. The fact that an extremely complex mixture is obtained, notwithstanding the NCO values indicative of a solution of substantially pure allophanate polyisocyanate in tolylene diisocyanate, is apparent from the infrared spectrum which, in addition to the bands characteristic of allophanate groups at 1725, 1690 and 1685 cm.$^{-1}$, contains, in particular, bands characteristic of isocyanurate at 1690 to 1720 cm.$^{-1}$ and at 1400 to 1430 cm.$^{-1}$ and also, although to a lesser extent, the bands characteristic of uretdione at 1755 to 1780 cm.$^{-1}$. This finding is confirmed by the fact that the free tolylene diisocyanate content of the mixture is only 33.9% by weight, while a free tolylene diisocyanate content of 47.9% is theoretically calculated on the basis of exclusive allophanate formation.

In a second test carried out in an identical manner, the reaction mixture is heated for 5 hours at 140° C. at the beginning of the reaction after the glycol has been added. The reaction mixture then has an NCO content of 27.7% and its infra-red spectrum shows strong bands characteristic of isocyanurate. It is no longer possible to conclude from the infra-red spectrum that an allophanate polyisocyanate is present in view of the free tolylene diisocyanate content of 22.7%, far below the theoretical value of 47.9%.

It is clear from the results of these tests that reaction of a urethane diisocyanate with excess tolylene diisocyanate does not yield a product whose constitution is solely at the allophanate stage. In fact, isocyanurate polyisocyanate is formed in considerable quantities under the reaction conditions specified in the British Pat. No. 994,890. This finding is by no means surprising, since the formation of isocyanurates from allophanates and isocyanates or dimers of these isocyanates is known from the literature and is described in, for example, I. C. Kogan, Journ. Am. Chem. Soc., vol. 78 (1956), pp. 4911–4914.

In is therefore an object of this invention to provide a process for the preparation of allophanate polyisocyanates devoid of the disadvantages of prior art processes. It is another object of this invention to provide a process for the preparation of allophanate polyisocyanates containing at least one aromatically bound isocyanate group. These and other objects which will become apparent from the following description are accomplished in accordance with the invention, generally speaking, by reacting N-substituted carbamic acid esters, which themselves may contain NCO groups, with monofunctional and/or polyfunctional isocyanates in the presence of compounds having an alkylating effect.

Accordingly, the present invention relates to a process for the production of allophanate polyisocyanates containing at least one aromatically bound isocyanate group comprising reacting an N-substituted carbamic acid ester with an organic monoisocyanate or polyisocyanate having aliphatically or aromatically bound isocyanate groups, either the N-substituted carbamic acid ester itself having at least one aromatically bound isocyanate group and/or polyisocyanates having at least two aromatically linked isocyanate-group being used, the reaction being carried out in the presence of a compound having an alkylating effect.

In a preferred embodiment of the process according to the invention, the N-substituted carbamic acid ester is formed in situ from the reaction of a polyisocyanate having at least two aromatically bound NCO groups and an organic compound containing at least one hydroxyl group reactive with NCO groups.

Some advantages which result from the process according to the invention are as follows:

(1) The formation of secondary products with an isocyanurate structure is governed to a large extent by the constitution of the hydroxyl compounds used to prepare the allophanate polyisocyanates. For example, secondary products with an isocyanurate structure are formed in large quantities from aromatic polyisocyanates and ethylene glycol, 1,2-propylene glycol or diglycol; while these secondary products are formed in much smaller amounts by reacting the same isocyanates with 2,2-dimethyl-1,3-propane diol, 2,2-diethyl-1,3-propane diol or trimethylol propane, under otherwise the same reaction conditions. The varying tendency of hydroxyl compounds to form undesired secondary products, attributable to variations in their constitution, is eliminated according to the invention by employing alkylating substances during the production of the allophanate polyisocyanates which can be used for a variety of purposes, so that it is now possible to use any hydroxyl compound with equal success.

(2) A high degree of functionality of the reaction components is desirable in many fields of polyurethane chemistry, such as, for example, in the preparation of hard foams. Allophanate polyisocyanates of high NCO functionality can readily be obtained from suitable hydroxyl compounds. Their functionality is kept intact by the addition, according to the invention, of alkylating compounds and is in no way reduced as a result of the formation of generally trimeric isocyanurate polyisocyanates.

(3) There are no signs of any undesired increase in viscosity attributable to the formation of the secondary products having an isocyanurate structure.

The N-substituted carbamic acid esters required for the process according to the invention can readily be obtained from monofunctional and/or polyfunctional compounds containing aliphatically, cycloaliphatically, araliphatically or aromatically linked hydroxyl groups and monofunctional and/or polyfunctional isocyanates. Following are some examples of suitable hydroxyl group-containing compounds and include linear or branched, saturated or unsaturated, monofunctional alcohols or phenols, optionally containing substituents or hetero atoms, such as methyl alcohol, butyl alcohol, 1-hexadecanol, isopropyl alcohol, isobutyl alcohol, 2,2-dimethyl-1-hexanol, 2,2-dimethyl-1-decanol, allyl alcohol, 1,1-dimethylallyl alcohol, octadec-9-en-1-ol, ethylene chlorohydrin, 2,2,2-trichloroethyl alcohol, 1,3-dichloro-2-propanol, 2,3-dibromo-1-propanol, ethylene glycol monomethyl ether, ethylene glycol monobutyl ether, diethylene glycol monoethyl ether, cyclohexanol, benzyl alcohol, 1-phenoxy-2-ethanol, phenol, cresols, dodecyl phenol and the like.

Polyfunctional hydroxyl compounds such as, for example, 1,2-propylene glycol, 1,2-, 1,3- and 2,3-butylene glycol and the like, glycols corresponding to the general formula $HO(CH_2)_nOH$ in which $n$ is an integer from 2 to 10, such as, for example, 2,2-dimethyl-2,2-diethyl-1,3-propane diol, 1,12-octadecane diol and the like; trimethylol propane, glycerol, hexane triol, pentaerythritol, sorbitol, mannitol and other higher hydric alcohols of similar structure; monoallyl ethers of trihydric and higher hydric alcohols and their saturated halogenation products such as, for example, 1,4-butene diol, 2,3-dibromo-1,4-butene diol, 2-chloro-1,2-propane diol, phenyl ethylene glycol, 1,4-cyclohexane diol, 2,2-bis-(4-hydroxy cyclohexyl)-propane, 1,4-bis - (hydroxymethyl) - cyclohexane, hydroquinone, pyrocatechol, 4,4'-dihydroxy diphenyl dimethylmethane and the like; polyphenols of the kind described in U.S. Pat. No. 3,330,781; phenol-formaldehyde condensation products; 4,4'-dihydroxy diphenyl carbonate and the like.

Linear or branched hydroxyl group-containing ether alcohols or polyethers with molecular weights of up to about 10,000, such as those obtained from the aforementioned compounds and alkylene oxides such as, for example, ethylene oxide, propylene oxide, butylene-1,2- and -2,3-oxide, isobutylene oxide, glycidol, epichlorohydrin, styrene oxide and the like or mixtures of these epoxides, are also suitable, as are low molecular weight or relatively high molecular weight linear or branched polyesters with terminal hydroxyl groups, obtained from the aforementioned hydroxyl group-containing compounds by esterification with monofunctional or polyfunctional carboxylic acids or hydroxy carboxylic acids. Hydroxyl group-containing polyacetals, polythioethers, polylactones, polycarbonates, polyethers and the like obtained from, for example, tetrahydrofuran and urethane group-containing polyols obtained from the aforementioned hydroxyl compounds and aliphatic, aromatic and/or araliphatic polyisocyanates may also be used as starting materials.

The reaction of the hydroxyl group-containing compounds with monofunctional and/or polyfunctional aliphatic, cycloaliphatic, araliphatic or aromatic isocyanates may be carried out an NCO:OH ratio of less than, equal to, or greater than 1. For example, to prepare carbamic acid esters which contain NCO groups, the reaction is carried out with an NCO:OH ratio of greater than 1, which necessitates the use of polyisocyanates with a functionality of at least 2. The components may be reacted either in the absence or in the presence of solvents, either at room temperature or at moderately elevated temperatures of up to about 100° C., the N-substituted carbamic acid esters being formed in what is generally an exothermic reaction.

Any monoisocyanates, diisocyanates or polyisocyanates, optionally in admixture, may be used both in the preparation of the carbamic acid esters, and in the process according to the invention. Some examples of suitable isocyanates include methyl isocyanate, propyl isocyanate, stearyl isocyanate, methoxymethyl isocyanate, cyclohexyl isocyanate, phenyl isocyanate, tolyl isocyanates, p-chlorophenyl isocyanate, 1,6-hexamethylene diisocyanate, cyclohexane-1,3- or 1,4-diisocyanate, 1-methyl cyclohexane-2,4- or 2,6-diisocyanate, m- or p-xylylene diisocyanate, 1,3- or 1,4-phenylene diisocyanate, 2,4- or 2,6-tolylene diisocyanate and the like, as well as mixtures of these isomers;

4,4'-diphenylmethane diisocyanate,
naphthalene-1,5-diisocyanate,
triphenylmethane-4,4',4''-triisocyanate,
1-isocyanatomethyl-5-isocyanato-1,2,3-trimethyl cyclohexane,
polyphenyl-polymethylene-polyisocyanates and the like which may be obtained by condensing aniline and/or alkyl-substituted anilines with formaldehyde, followed by phosgenation. Polyisocyanates preferably used in the process according to the invention include 2,4-tolylene diisocyanate, 2,6-tolylene diisocyanate and mixtures of these isomers as well as 4,4'-diphenylmethane diisocyanate and polyphenyl-polymethylene-polyisocyanates obtained by the phosgenation of aniline-formaldehyde condensation products.

According to the process of the invention, the allophanate polyisocyanates containing at least one aromatically linked NCO group are obtained from the N-substituted carbamic acid esters by reaction with isocyanate in the presence of compounds having an alkylating effect. The quantitative proportions in which the starting components are used in the process according to the invention are selected in such a manner, taking into account the functionality of the starting components, that allophanate polyisocyanates of the particular functionality required, and containing at least one aromatically bound isocyanate group, are obtained. The last of these requirements rules out the use of aliphatic, cycloaliphatic or araliphatic isocyanates for converting the N-substituted carbamic acid esters into allophanates if the carbamic acid esters have been prepared using only these isocyanates and for this reason do not contain any aromatically bound isocyanate groups. By virtue of the process according to the invention, it is possible, for example, in the case of extensive allophanatization, to prepare a tetrafunctional allophanate polyisocyanate from a bis-urethane diisocyanate and 2 mols of diisocyanate, or to prepare a hexafunctional allophanate polyisocyanate from a tris-urethane triisocyanate and 3 mols of diisocyanate. Partial allophanatization is, of course, also possible. Allophanate polyisocyanates which contain N-substituted carbamic acid ester groups are obtained in this instance.

Alkylating compounds suitable for use in the process according to the invention include, for example, methyl iodide, dimethyl phosphite, dimethyl sulphite, trimethyloxonium tetrafluoroborate and the like; dialkyl sulphates such as, for example, dimethyl sulfate, diethyl sulphate, methyl ethyl sulfate or dibutyl sulphate and the like; aliphatic sulphonic acid alkyl esters such as, for example, methane sulphonic acid methyl ester, methane sulphonic acid ethyl ester, ethane sulphonic acid methyl-, ethyl- or -n-butyl ester and the like; vinyl-, propene-1- or propene-2-sulphonic acid alkyl esters in which the alkyl radical can be linear or branched and may contain up to 6 carbon atoms; sulphoacetic acid dimethyl ester, 3-sulphopropionic acid dimethyl- or diethyl ester; 4-sulphobutyric acid dimethyl ester; methane thiosulphonic acid methyl ester; aliphatic disulphonic acid esters such as 1,2-ethane- or 1,3-propane-disulphonic acid diethyl ester and the like; benzyl sulphonic acid alkyl esters; aromatic sulphonic acid alkyl esters whose aromatic ring can be substituted and whose alkyl group can be linear or branched such as, for example, benzene sulphonic acid methyl ester, benzene sulphonic acid ethyl ester, p-chlorobenzene sulphonic acid ethyl ester, p-toluene sulphonic acid methyl, ethyl, butyl and cetyl esters and the like; naphthalene sulphonic acid alkyl esters; sulphobenzoic acid dimethyl ester; aryl bis- or poly-sulphonic acid esters such as, for example, toluene-bis-sulphonic acid dimethyl ester, phenol-2,6-disulphonic acid ester and the like; sulphones such as, for example, g-propane sulphone, butane sulphone and their alkyl-substitution products are also suitable.

Dialkyl esters of sulphuric acid which are derived from $C_1$ to $C_{20}$ preferably $C_1$ to $C_4$ aliphatic monovalent alcohols as well as esters of such alcohols with $C_6$ to $C_{10}$ aromatic resp. $C_1$ to $C_{18}$ aliphatic sulphonic acids are preferably used in the process according to the invention. Most preferred is p-toluyl sulphonic acid methyl ester. The alkylating agents may be used either individually or in admixture with one another, in quantities of from about 0.001% to about 5% by weight, based on the total weight of the reactants. It is remarkable that, with strong alkylating agents such as dialkyl sulphates and aliphatic or aromatic sulphonic acid alkyl esters having a lower alkyl radical, especially the methyl esters, that quantities as low as from about 0.001% to about 0.1% by weight are sufficient to effectively inhibit the formation of isocyanurate-containing secondary products.

The reaction according to the invention of the monoisocyanates or polyisocyanates with the N-substituted carbamic acid esters is preferably carried out at temperatures of from about 20° C. to about 180° C., over a period of from about 2 to about 50 hours, either at normal or excess pressure, in the absence or presence of solvents, which solvents should not contain any hydrogen atoms reactive with isocyanates.

It is especially preferred to carry out the process of the invention in the presence of metal compounds of metals of the III– or IV–A group (main groups) or of the II–, VI–, VII– or VIII–B group (sub groups) of the periodic system of elements which metal compounds must be soluble in the mono- or polyisocyanates.

Some suitable metal compounds are, for example, any metal compounds which are soluble in mono- or polyisocyanates of metals of the III– or IV–A group or of the I–, II–, VI–, VII– or VIII–B group of the periodic system of elements such as, for example, metal halides such as, for example, iron-(III)-chloride, zinc chloride and the like; metal alcoholates such as, for example, titanium tetrabutylate, zirconium tetrapropylate and the like; metal salts of organic acids such as, for example, tin-(II)-octoate, iron-(III)-2-ethyl hexoate, cobalt-2-ethylhexoate, cobaltnaphenate, cobaltbenzoate, the cobalt salt of undecylenic acid, nickel-2-ethylhexoate, nickel - naphthenate, aluminiumoleate, manganese -(II) - 2 - ethylhexoate and the like; chleates of copper, cobalt, nickel, iron, zinc, manganese and aluminium with ligands such as, for example, b-dicarbonyl compounds such as acetylacetone, acetoacetic acid ethyl ester, 1,1-dimethyl-cyclohexane-dione-3,5 and the like; hydroxy-oxy-compounds such as, for example, salicyl aldehyde, o-hydroxyacetophenone and the like; complex forming acids such as, for example, salicylic acid, ascorbinic acid and the like.

Generally speaking all metal compounds of the formula $$MeX_n$$

can be used in the process of the invention. In this formula $n$ stands for 2, 3 or 4; Me stands for a n-valent metallic cation derived from a metal of the III– or IV–A group or of the I–, II–, VI–, VII–, or VIII–B group of the periodic system of elements; and X is a monovalent anion selected from the group consisting of halogenide, carboxylate, alcoholate, phenolate and an anion derived from a β-diketone.

Copper-(II)- acetylacetonate, tin-(II)-octoate and zinc-acetylacetonate are preferred catalysts for the process of the invention.

The catalytic properties of the metal compounds is independent of the nature of the anionic radical which is attached to the metal, however, it is essential that the metal compounds be soluble in the mono- or polyisocyanates which are used in the process of the invention. Preferred metal compounds are organic compounds of the metals of the II– and VIII–B groups, especially compounds of zinc, cobalt, nickel and iron. Most preferred catalysts are acetylacetonates of cobalt and zinc.

The metal catalysts are used in quantities of from about 0.001% to about 5% by weight, preferably of from about 0.01% to about 1% by weight based on the total weight of the reaction components.

When alkylating compounds and metal catalysts are used simultaneously in the process of the invention the reaction of mono- or polyisocyanates with N-substituted carbamic acid esters may be carried out at temperatures of from about 20 to about 120° C., especially of from about 70 to about 100° C. for from about 2 to about 15 hours.

The additional advantages which result from the simultaneous application of metal catalysts and alkylating compounds are:

(1) Without metal catalysts the reaction of the invention normally has to be carried out at temperatures of from about 100° C. to about 180° C. whereas the simultaneous use of metal catalysts allows reaction temperatures of from about 20° C. to about 120° C., preferably of from about 70° C. to about 100° C.

(2) In the absence of metal catalysts reaction times of from about 5 to about 50 hours are necessary, when the metal catalysts are simultaneously used reaction times of from about 2 to about 15 hours are sufficient.

(3) The lower reaction temperature facilitates a complete allophanate formation whereas complete conversion of all carbamic acid ester groups into allophanate groups is hardly possible in the absence of the metal catalysts. (See for example, Example 1, Example 3, Test B, Example 4 and Example 5, infra.)

(4) Complete conversion of all carbamic acid ester groups into allophanate groups permits a maximum increase of functionality of a polyisocyanate mixture.

Formation of the allophanate polyisocyanates can readily be followed and controlled by quantitatively determining the NCO content of the reaction mixtures in conjunction with infrared spectroscopic measurements. It is characterized by the coupled appearance of absorption bands at 1725 cm.$^{-1}$ and at 1685 to 1690 cm.$^{-1}$ and by the presence of a band characteristic of the isocyanurate structure at 1400 to 1430 cm.$^{-1}$.

The isocyanates used for allophanate formation are preferably used in excess, so that solutions of allophanate polyisocyanates in excess isocyanate are obtained. The pure allophanate polyisocyanates can be obtained from these solutions, for example, by removing the excess isocyanate either by falling-film distillation or by extraction with suitable solvents.

In a preferred embodiment of the process according to the invention, the N-substituted carbamic acid esters are prepared and subsequently reacted with polyisocyanates into allophanate polyisocyanates in a single operation. For this purpose, the aforementioned hydroxyl group-containing compounds are initially reacted at a temperature from room temperature to about 100° C. with an excess of aromatic polyisocyanates in the presence of the alkylating agents, optionally in the presence of metal catalysts, used in accordance with the invention to form the N-substituted carbamic acid esters. Solutions of allophanate polyisocyanate in excess polyisocyanate used as starting material are then obtained by heating the resulting solutions of the carbamic acid esters in excess polyisocyanate at temperatures of from about 20° C. to about 180° C.

It is also in the process according to the invention, when using aromatic polyisocyanates which are particularly important in the practice of polyurethane chemistry, to produce allophanate polyisocyanates with a degree of functionality adapted to meet the particular requirements. The end products, most of which are highly soluble in organic solvents, can be used either individually or in admixture with other polyisocyanates, preferably dissolved in the polyisocyanates used in their preparation, for the production of polyurethane plastics by the well-known isocyanate- polyaddition process as described in, for example, Saunders and Frish, "Polyurethane: Chemistry and Technology," part II, Interscience Publishers, 1964.

Since the allophanate polyisocyanates obtained by the process according to the invention are distinguished especially by their much lower viscosity, from the isocyanurate-containing polyisocyanate mixtures obtained in the absence of alkylating agents, they can be mixed much more quickly and homogeneously with the reagents used in the production of polyurethane plastics, especially polyurethane foams, an advantage which is of the utmost importance, for example, in the machine-fabrication of foams.

Accordingly, the present invention also relates to the use of the allophanate polyisocyanates obtained by the process according to the invention as an isocyanurate component in the production of polyurethane foams by the isocyanate-polyaddition process.

Polyurethane plastics prepared using the allophanate polyisocyanates are distinguished from plastics obtained from the usual polyisocyanates in paricular by their greater non-flammability. Any compounds commonly used in polyurethane chemistry having hydrogen atoms that are reactive to isocyanate groups, preferably polyfunctional components containing hydroxyl groups, may be used as starting materials. Any of the additives commonly used in polyurethane chemistry, for example catalysts, expanding agents, stabilizers, etc. may, of course, also be used in the production of polyurethane plastics using the allophanate polyisocyanates.

The products obtained by the process according to the invention are also suitable for the production of impregnations or coatings on substrates, protective paints or adhesives.

The invention is further illustrated but it is not intended to be limited by the following examples in which all parts and percentages are by weight unless otherwise specified.

EXAMPLE 1

The alkylating agents specified in Table I are added to about 1392 parts of tolylene diisocyanate (80:20 mixture of the 2,4- and 2,6-isomers; 0.005% of hydrolysable chlorine, 0.003% of acid chloride chlorine, 0.01% of total chlorine), after which about 62 parts by weight of ethylene glycol are added with continuous stirring over a period of from about 45 minutes at from about 80° C. to about 85° C. After the glycol has been added, the reaction mixtures are heated for about 20 hours at from about 130° C. to about 135° C. The NCO contents obtained after this time and the results of infra-red spectroscopic measurements are set out in Table I, plus (+) or minus (−) signs indicating the presence or absence of the groups specified.

TABLE I

| Test reference | Alkylating agent | | Percent NCO | Infra-red spectrum | |
| --- | --- | --- | --- | --- | --- |
| | Type | Parts | | Allophanate | Isocyanurate |
| 2003/1 | None | | 27.3 | − | + |
| 2003/2 | Dimethyl sulphate | 0.7 | 37.8 | + | − |
| 2003/3 | do | 0.35 | 37.5 | + | − |
| 2003/6 | do | 0.175 | 37.5 | + | − |
| 2003/4 | Benzene sulphonic acid methyl ester | 0.7 | 36.2 | + | − |
| 2003/5 | do | 0.35 | 36.7 | + | − |
| 2003/7 | do | 0.175 | 35.2 | + | − |
| 332/b | Toluene sulphonic acid methyl ester | 0.7 | 34.9 | + | − |
| 332/h | Toluene sulphonic acid ethyl ester | 0.7 | 35.0 | + | − |
| 345/e | Toluene sulphonic acid butyl ester | 0.7 | 34.9 | + | − |
| 332/d | Methane sulphonic acid ethyl ester | 0.7 | 34.9 | + | − |
| 332/e | Methane sulphonic acid butyl ester | 0.7 | 35.1 | + | − |

All of the NCO values exceed the theoretical value of 34.7% NCO for complete allophanatization in the presence of an alkylating agent, in contrast to control test 2003/1 wherein no alkylating agent was added and in which after a heating period of only 4 hours, the reaction continues beyond the allophanate polyisocyanate stage up to the formation of isocyanurate-containing secondary products as shown by the infra-red spectrum.

EXAMPLE 2

The procedure is as described in Example 1, the type and quantity of alkylating agent used, the reaction time and temperature and the results obtained are as set out in Table II. The tolylene diisocyanate used (an 80:20 mixture of the 2,4- and 2,6-isomer) is essentially the same as that used in Example 1.

As can be seen, all the tests carried out with alkylating agents show the infra-red spectrum bands characteristic of an allophanate, in contrast to control test 2016/2 in which, after a reaction time of only about 2.25 hours, the reaction progresses beyond the allophanate polyisocyanate stage up to the formation of isocyanurates.

TABLE II

| Test reference | Alkylating agent | | Reaction | | | Infra-red spectrum | |
|---|---|---|---|---|---|---|---|
| | Type | Parts | Time (hrs.) | Temp., °C. | Percent NCO | Allophanate | Isocyanurate |
| 2016/2 | No addition | | 2.25 | 130 | 27.2 | − | + |
| 2016/3 | Dimethyl sulphate | 0.7 | 18 | 130 | 32.9 | + | − |
| 2016/6 | do | 0.7 | 18 | 150 | 32.5 | + | − |
| 2016/4 | Diethyl sulphate | 0.7 | 18 | 130 | 33.9 | + | − |
| 2016/5 | Propane sultone | 0.7 | 18 | 130 | 32.5 | + | − |
| 2016/12 | Dimethyl sulphite | 0.7 | 20 | 13) | 35.9 | + | − |
| 2016/13 | Dimethyl phosphite | 0.7 | 18 | 13) | 35.3 | + | − |
| 345/1 | Triethyl oxonium tetrafluoroborate | 7 | 10 | 130 | 36.1 | + | − |
| 347 [1] | Methyliodide | 48 | 10 | 130 | 35.2 | + | − |

[1] The test was carried out under pressure in a sealed vessel.

EXAMPLE 3

Test A

About 106 parts of diglycol are added over a period of about 1 hour at from about 80° C. to about 90° C. to about 1392 parts of tolylene diisocyanate (80:20 mixture of the 2,4- and 2,6-isomers). The reaction mixture is then heated for about 6.5 hours at about 140° C. in the presence of nitrogen as protective gas.

Test B

Following the same procedure as Test A, about 1.4 parts of benzene sulphonic acid methyl ester are added to the reaction mixture after the diglycol, followed by heating for about 30 minutes at about 140° C. The results of both tests are as follows:

| Test ref. | Reaction | | | Viscosity (cp. at 25° C.) | Infra-red spectrum | |
|---|---|---|---|---|---|---|
| | Time (hrs.) | Temp. (°C.) | Percent NCO | | Allophanate | Isocyanurate |
| A | 6.5 | 140 | 31.9 | 1,825 | − | + |
| B | 30 | 140 | 34.8 | 157 | + | − |

As can be seen, Test B, carried out in accordance with the process of the invention, produce the bands characteristic of an allophanate polyisocyanate in the infra-red spectrum in the absence of isocyanurate-containing secondary products. In consistency with this result, and despite a much longer heating period in comparison with Test A, an NCO value of about 34.8% is obtained, being very close to the theoretical NCO value of 33.6% for complete allophanatization. The low viscosity of 157 cp. at 25° C., as against 1825 cp. at 25° C. in the comparison test, is also characteristic.

EXAMPLE 4

About 0.6 part of benzene sulphonic acid methyl ester is added at room temperature to about 1218 parts of tolylene-2,4-diisocyanate. After heating to about 80° C., about 106 parts of diglycol are added over a period of about 1 hour, during which the temperature is kept in the range of from about 80° C. to about 90° C. The reaction mixture is then heated with continuous stirring for about 30 hours at about 140° C. in the presence of nitrogen as protective gas. At the end of this time, the reaction mixture has the following characteristics: 32.5% NCO (theoretical value for complete allophanatization 31.7% NCO), viscosity 520 cp. at 25° C., solids content 59.0%, (theoretical 60.6% for complete allophanatization). The infra-red spectrum shows the bands characteristic of allophanate at 1725 cm.−1 and 1685 to 1690 cm.−1, and does not provide any indication of the presence of secondary products with an isocyanurate structure.

In a comparison test, in which no benzene sulphonic acid methyl ester is added, an NCO value of 31.7% and viscosity of 1410 cp. at 25° C. are obtained after heating for about 5 hours at about 140° C., and by an absorption band at 1430 cm.−1, the infra-red spectrum indicates isocyanurate-containing secondary products.

EXAMPLE 5

About 228 parts of 4,4′-dihydroxy diphenyl dimethyl methane, about 1740 parts of tolylene-2,4-diisocyanate and about 2 parts of p-toluene sulphonic acid methyl ester are heated with vigorous stirring for about 30 hours at about 160° C. in the presence of nitrogen as protective gas (Test A). In a second test (B), similar procedure is adopted except that no p-toluene sulphonic acid methyl ester is added. At the end of this period, the reaction mixtures are characterized by the following data:

| Test reference | Percent NCO | Viscosity (cp. 25° C.) | Infra-red spectrum | |
|---|---|---|---|---|
| | | | Allophanate | Isocyanurate |
| A | 36.1 | 114 | + | − |
| B | 33.0 | 872 | − | + |

As can be seen, the test carried out in accordance with the process of the invention, Test A, produces the bands characteristic of allophanate in the infra-red spectrum, in contrast to control Test B, in which isocyanurate-containing secondary products are formed. Consistent with this finding, the NCO content of 36.1% for Test A, is between the theoretical values of 38.4% for a bis-urethane diisocyanate in excess tolylene-2,4-diisocyanate and 34.1% for an allophanate polyisocyanate of 1 mol of 4,4′-dihydroxy diphenyl dimethyl methane and 4 mols of tolylene-2,4-diisocyanate in excess diisocyanate. In Test B, the NCO value of 33.0% indicates that the reaction has progressed in favor of the formation of isocyanurate polyisocyanates. The differences between the viscosities of the reaction mixtures are also characteristic, the low value of 114 c.p. at 25° C. making the effectiveness of the alkylating agent used according to the invention particularly clear.

EXAMPLE 6

About 62 parts of ethylene glycol are added dropwise to about 1344 parts of hexamethylene diisocyanate over a period of about 20 minutes, and the resulting mixture is reacted for about 1 hour at about 80° C. At the end of this period, a bis-urethane diisocyanate is formed from about 1 mol of ethylene glycol and about 2 mols of hexamethylene diisocyanate dissolved in excess diisocyanate, with an NCO value for the solution of about 41.4% as against the theoretical value of 41.8%. About 199 parts of the pure bis-urethane diisocyanate obtained from the solution by distillation in a high vacuum are reacted with about 348 parts of tolylene-2,4-diisocyanate for about 18 hours at about 140° C. in the presence of about 0.55 part of p-toluene sulphonic acid methyl ester and also in the presence of nitrogen as protective gas. The reaction mixture is characterized by an NCO content of 31.0% (theoretical value for an allophanate polyisocyanate in excess tolylene-2,4-diisocyanate 30.7%) and by the bands in the infra-red spectrum characteristic of allophanate.

By contrast, a control test carried out without any addition of p-toluene sulphonic acid methyl ester, over a period of only about 8 hours at about 140° C., leads to an NCO value of 27.5% and produces the bands characteristic of isocyanurate in the infra-red spectrum.

EXAMPLE 7

About 1000 parts of a linear polypropylene glycol ether with a hydroxyl number of 112 (about 1 mol) are heated for about 10 hours at about 150° C. with about 1044 parts (about 6 mols) of tolylene diisocyanate (80:20 mixture of the 2,4- and 2,6-isomers), in the presence of about 2 parts of p-toluene sulphonic acid methyl ester and in the presence of nitrogen as protective gas (Test A). In a second test (B), a similar procedure is adopted except that no p-toluene sulphonic acid methyl ester is added and the heating period is reduced to only about 2.25 hours. The reaction mixtures are characterized by the following data:

| Test ref. | Reaction Temp. (° C.) | Time (hrs.) | Percent NCO | Viscosity (cp. 25° C.) | Infra-red spectrum Allophanate | Isocyanurate |
|---|---|---|---|---|---|---|
| A | 150 | 10 | 17.9 | 1,120 | + | − |
| B | 150 | 2¼ | 13.3 | Highly viscous | − | + |

As can be seen, Test A produces the bands characteristic of allophanate in the infra-red spectrum, in contrast to Test B in which isocyanurate-containing secondary products are indicated by the corresponding bands. In complete consistency with this finding, test product A is distinguished by low viscosity and test product B by an extremely high viscosity. In addition, the NCO content in Test A is between the theoretical values of 20.5%, for bis-urethane diisocyanate in excess tolylene diisocyanate, and 16.4%, for an allophanate polyisocyanate of 1 mol of polypropylene glycol ether and 4 mols of tolylene diisocyanate in excess diisocyanate. The NCO content of 13.3% in Test B indicates that the reaction has followed a different course, favoring the formation of isocyanurate polyisocyanates.

If about 1 mol of polypropylene glycol ether is reacted for about 22 hours at about 150° C. with about 5 mols of tolylene diisocyanate in the presence of about 0.2% of p-toluene sulphonic acid methyl ester, based on the total weight of the components, an allophanate polyisocyanate dissolved in excess diisocyanate without any isocyanurate-containing secondary products, with an NCO content of about 15.4% according to the infra-red spectrum and with a viscosity of about 2500 cp. at 25° C. is formed.

Preparation of a foam

About 100 parts of this latter allophanate polyisocyanate (NCO content about 15.4%) is mixed with about 3.7 parts of N-ethyl diethanolamine, about 2.8 parts of water, about 0.25 part of stannous octoate and about 0.25 part of an organosiloxane-alkylene oxide block polymer as stabilizer. A semi-elastic fine-pored foam containing a large number of closed cells, which is eminently suitable for insulating purposes, is formed after the reaction mixture has foamed and solidified.

EXAMPLE 8

About 1000 parts of a linear polypropylene glycol ether with a hydroxyl number of 56 is heated for about 20 hours at about 150° C. with about 522 parts of tolylene diisocyanate (80:20 mixture of the 2,4- and 2,6-isomer) in the presence of about 1.5 parts of p-toluene sulphonic acid methyl ester and in the presence of nitrogen as inert gas (Test A). A control test (B) is similarly carried out except that no p-toluene sulphonic acid methyl ester is added. The reaction mixtures are characterized by the following data:

| Test reference | Percent NCO | Viscosity (cp. 25° C.) | Infra-red spectrum Allophanate | Isocyanurate |
|---|---|---|---|---|
| A | 12.3 | 1,365 | + | − |
| B | 10.0 | 8,240 | − | + |

As can be seen, Test A produces the bands characteristic of allophanate in the infra-red spectrum, in contrast to Test B in which isocyanurate-containing secondary products are indicated. In consistency with this finding, test product A is distinguished by a low viscosity and test product B by a high viscosity. In addition, the NCO content of Test A is between the theoretical values of 13.8% for a bis-urethane diisocyanate in excess tolylene diisocyanate and 11.0% for an allophanate polyisocyanate of 1 mol of polypropylene glycol ether and 4 mols of tolylene diisocyanate in excess diisocyanate. The NCO content of 10.0% indicates that the reaction has followed a course favoring the formation of isocyanurate polyisocyanates, as is also indicated by the infra-red spectrum.

Preparation of a foam

About 200 parts of the allophanate polyisocyanate of Test A (NCO content 12.3%) are thoroughly mixed with a mixture of about 3 parts of water, about 3.4 parts of N-ethyl diethanolamine, about 1 part of triethylene diamine and about 1 part of stannous octoate. The reaction mixture begins to foam after a short time and solidifies after a few minutes to form an elastic foam with a natural sponge structure.

EXAMPLE 9

About 106 parts of diethylene glycol are added over a period of about 2 hours at a temperature of about 80° C. to a mixture of about 500 parts of 4,4′-diisocyanato diphenyl methane and about 1.54 parts of p-toluene sulphonic acid methyl ester. After about 30 minutes, the reaction mixture has an NCO content of about 13.6% (calculated 13.86%). About 1044 parts of tolylene diisocyanate (80:20 mixture of the 2,4- and 2,6-isomers) are then added. The mixture is then heated for about 12 hours at about 140° C. The NCO content is now about 31.1% (calculated 13.86%). About 1044 parts of tolylene diisocyanate groups into allophanate groups: 30.5%). The product obtained has a viscosity of about 1665 cp. at 25° C. The bands characteristic of allophanate groups are recognizable in the intra-red spectrum, while those characteristics of isocyanurate groups are not present.

A test mixture which is distinguished from the mixture which has just been described, solely by the absence of the p-toluene sulphonic acid methyl ester component has an NCO content of about 25.2% after the test is completed in exactly the same manner. The product obtained is a semi-solid resin in whose infra-red spectrum the presence of isocyanurate groups is indicated by a strong band at 1430 cm.$^{-1}$.

EXAMPLE 10

About 536 parts of dipropylene glycol are added over a period of about 105 minutes at a temperature of about 80° C. to a mixture of about 4176 parts of tolylene diisocyanate (80:20 mixture of the 2,4- and 2,6-isomers) and about 2.1 parts of p-toluene sulphonic acid methyl ester. The mixture is then heated for about 24 hours at a temperature of about 130° C. It has an NCO content of about 30.75% (calculated for the complete formation of allophanate groups: 28.5%). It has a viscosity of about 1130 cp. at 25° C. The infra-red spectrum shows that no isocyanurate-containing secondary products are present.

Preparation of a foam

About 130 parts of the product thus obtained are thoroughly mixed with about 100 parts of polyether of trimethylol propane and propylene oxide, having a hydroxyl number of 540, and with about 60 parts of fluorotrichloromethane, about 3 parts of N-methyl-N'-dimethylaminoethyl piperazine and about 1 part of a polysiloxane-polyalkylene oxide copolymer. A hard foam with a fine uniform cell structure which may be used, for example, as a heat-insulating material is formed over a period of about 3 minutes.

EXAMPLE 11

To about 1914 parts of tolylene-2,4- and -2,6-diisocyanate, isomer ratio 80:20, are added at room temperature about 2 parts by weight of methyl p-toluene sulphonate, the kind and quantity of catalyst given in Table III. When the temperature reaches about 60° C. due to the exothermic reaction, about 62 parts of ethylene glycol are added in the course of five to ten minutes. A temperature of about 100° C. is reached after the exothermic reaction is maintained during the further course of the experiment, during which the allophanate polyisocyanate is formed. As the table indicates, the catalysts used cause, compared with the control test No. 1 in which no catalyst is used, within a relatively short period of time, a more complete allophanatization of the bis-urethane diisocyanate first formed, as indicated by the NCO values given, in comparison with the calculated value of 38.3% NCO for a complete allophanatization. The bands characteristic of allophanate in the IR spectrum are found in all tests carried out with the catalysts.

TABLE III

| Test reference | Catalyst Constitution | Quantity | Reaction time, hours | Percent NCO |
|---|---|---|---|---|
| 1 | No addition | | 20 | ¹ 41.8 |
| 2 | Zinc acetyl acetonate | 0.4 | 5 | 38.3 |
| 3 | Zirconium acetyl acetonate | 1.0 | 6 | 38.4 |
| 4 | Manganese acetyl acetonate | 0.4 | 4 | 38.4 |
| 5 | Zinc benzoate | 0.8 | 10 | 38.3 |
| 6 | Zinc stearate | 0.8 | 6 | 38.4 |
| 7 | Aluminium triisopropylate | 2.0 | 8.5 | 38.2 |
| 8 | Zinc undecylenate | 0.8 | 14 | 38.3 |
| 9 | Zinc chloride | 0.8 | 9 | 38.6 |
| 10 | Iron acetyl acetonate | 0.8 | 7 | 38.7 |
| 11 | Cobalt acetyl acetonate | 0.8 | 2 | 38.6 |
| 12 | Nickel acetyl acetonate | 0.8 | 6 | 38.7 |

¹ Crystallization.

EXAMPLE 12

To about 239.25 parts of a mixture of tolylene-2,4- and -2,6-diisocyanate, isomer ratio 80:20, are added at room temperature about 0.24 part of methyl-p-toluene sulphonate, the catalysts given in Table IV with respect to its kind and quantity (given in percent by weight, based on the weight of isocyanate used). In the course of about 30 minutes at about 80° C., 26 parts of 2,2-dimethylpropane-diol-1,3 are added with constant stirring with nitrogen as a protective gas.

The reaction mixture is heated to about 100° C. After the time of the experiment, as stated in the table, is terminated the NCO content of the products obtained is determined, and an infrared spectrum is made of every batch for testing for by-products containing isocyanurate. The table shows that the compounds of cobalt, zinc, cadmium, iron, and manganese indicated under numbers 2–13 cause in the concentrations stated that the value of 27.7% NCO as determined by calculation for thorough allophanatization is reached completely or almost completely, while in the blank test given under No. 1 without addition of catalyst the NCO content, in spite or prolonged time of the test, does not go below 34.9%. As the infra-red spectra shows, none of the products contain admixtures containing isocyanurate.

TABLE IV

| Test reference | Catalyst Constitution | Quantity | Reaction time, hours | Percent NCO |
|---|---|---|---|---|
| 1 | No addition | | 20 | 34.9 |
| 2 | Cobalt acetyl acetonate | 0.02 | 8 | 27.9 |
| 3 | Cobalt-2-ethylhexoate | 0.02 | 9 | 27.7 |
| 4 | Zinc acetyl acetonate | 0.02 | 10 | 27.9 |
| 5 | Zinc benzoate | 0.01 | 8.5 | 27.9 |
| 6 | Zinc stearate | 0.03 | 7 | 27.7 |
| 7 | Zinc undecylenate | 0.03 | 7 | 27.7 |
| 8 | Zinc salicylate | 0.03 | 4 | 27.6 |
| 9 | Zinc oleate | 0.03 | 7 | 27.7 |
| 10 | Zinc benzoyl acetonate | 0.04 | 7 | 27.6 |
| 11 | Cadmium-2-ethylhexoate | 0.03 | 9 | 27.6 |
| 12 | Iron-III-acetyl acetonate | 0.05 | 11 | 27.9 |
| 13 | Manganese-II-stearate | 0.03 | 5 | 27.5 |
| 14 | Nickel acetyl acetonate | 0.03 | 11 | 28.6 |
| 15 | Titanium tetrabutylate | 0.01 | 9.5 | 30.0 |

EXAMPLE 13

About 100 parts of a trifunctional propylene oxide/ethylene oxide/polyether based on trimethylol propane with an OH value of 35 and 70 percent primary OH groups are reacted with about 2.0 parts of diethylene glycol, about 2.5 parts of water, about 0.3 part of triethylenediamine, and about 38.3 parts of allophanate isocyanate prepared in Example 1, test reference 2003/2, to form a flexible self-extinguishing polyurethane foam with the following properties.

Density (kg./m.³) _____ 39
Elongation at break (percent) _____ 135
Tensile strength (kgf./cm.²) _____ 0.7
Deflection hardness (gf./cm.² at 40% compression) _ 19
Compression set (percent at 90% compression) ___ 4.4
Flame test according to ASTM D1692–67T:
   Mean combustion length (mm.) _____ 32
   Mean time of extinguishing (sec.) _____ 20

Although the invention has been illustrated in considerable detail by the foregoing examples, it is to be understood that all of the materials given as suitable herein may be freely substituted for their counterparts used in the examples and that one skilled in the art may make many variations without departing from the spirit and scope of the invention.

What is claimed is:

1. A process for the the production of allophanate polyisocyanates containing at least one aromatically bound isocyanate group comprising reacting at a temperature of from about 20° C. to about 180° C. an N-substituted carbamic acid ester with an organic mono- or polyisocyanate in the presence of from about 0.001% to about 5% by weight based on the total weight of reactants a compound having an alkylating effect selected from the group consisting of dialkyl esters of sulphuric acid derived from $C_1$ to $C_{20}$ aliphatic monovalent alcohols, $C_6$ to $C_{10}$ aromatic sulphonic acid alkyl esters or $C_1$ to $C_{18}$ aliphatic sulphonic acid alkyl esters.

2. The process of claim 1 wherein the N-substituted carbamic acid ester contains at least one aromatically bound isocyanate group.

3. The process of claim 1 wherein the polyisocyanate contains at least two aromatically bound isocyanate groups.

4. The process of claim 1 wherein the reaction is carried out in the presence of a catalytic amount of a metal compound which is soluble in the mono- or polyisocyanate, the metal component of the metal compound being selected from the III–A, IV–A, I–B, II–B, VI–B, VII–B, or the VIII–B groups of the periodic system of elements.

5. The process of claim 4, wherein the metal component of the metal compound is zinc, cobalt, nickel, iron, copper or tin.

6. The process of claim 1 wherein the N-substituted carbamic acid ester is formed in situ from the reaction of an aromatic polyisocyanate and an organic compound containing at least one hydroxyl group reactive with isocyanate groups.

7. The process of claim 6 wherein the aromatic polyisocyanate is tolylene diisocyanate or an isomeric mixture of 2,4- and 2,6-tolylene diisocyanate.

8. The process of claim 1 wherein the compound having an alkylating effect is a sulfonic acid alkyl ester.

9. The process of claim 8 wherein the compound having an alkylating effect is p-toluyl sulfonic acid methyl ester.

References Cited
UNITED STATES PATENTS
3,306,926  2/1967  Neher et al. _____ 260—471 C LORRAINE A. WEINBERGER, Primary Examiner L. A. THAXTON, Assistant Examiner U.S. Cl. X.R.

260—2.5 AT, 77.5 AT, 391